United States Patent [19]

Nishiyama

[11] Patent Number: 4,571,055
[45] Date of Patent: Feb. 18, 1986

[54] TRANSPORT ITEM DETECTING ARRANGEMENT

[75] Inventor: Haruo Nishiyama, Nara, Japan

[73] Assignee: Sharp Kabushiki Kaisha, Osaka, Japan

[21] Appl. No.: 681,149

[22] Filed: Dec. 13, 1984

[30] Foreign Application Priority Data

Dec. 17, 1983 [JP] Japan .................................. 58-238411
Dec. 17, 1983 [JP] Japan .................................. 58-238412
Dec. 17, 1983 [JP] Japan .................................. 58-238413

[51] Int. Cl.$^4$ ............................................. G03G 15/00
[52] U.S. Cl. ................................. 355/3 SH; 355/14 R; 355/14 SH; 356/229; 271/258
[58] Field of Search ............... 355/14 R, 14 SH, 3 SH, 355/3 R, 14 CH; 356/213, 218, 229, 230; 271/258, 263, 265; 371/25; 118/665, 668

[56] References Cited

U.S. PATENT DOCUMENTS

| | | | |
|---|---|---|---|
| 3,654,893 | 4/1972 | Piper et al. | 118/668 |
| 3,922,380 | 11/1975 | Rowell et al. | 118/665 X |
| 3,969,114 | 7/1976 | Prats | 118/665 X |
| 4,235,550 | 11/1980 | Case | 355/14 SH X |
| 4,304,486 | 12/1981 | Cormier et al. | 355/14 SH X |
| 4,341,460 | 7/1982 | Kohyama | 355/14 SH X |
| 4,372,672 | 2/1983 | Pries | 118/665 X |
| 4,417,804 | 11/1983 | Werner, Jr. | 355/14 CH |

Primary Examiner—A. C. Prescott
Attorney, Agent, or Firm—Birch, Stewart, Kolasch & Birch

[57] ABSTRACT

The disclosure is directed to a detecting arrangement for detecting presence or absence of an item to be transported, for example, a paper sheet or the like, which includes a light emitting element and a light receiving element disposed to confront a transport passage as a sensor for detection of the item to be transported along the passage. The detecting arrangement is characterized in that there are further provided a comparing circuit for comparing a signal responding to an output of the sensor with an integrated signal from an integrating circuit of an output of the sensor, thereby to employ a signal based on the result of the comparison as a signal indicating presence or absence of the item to be transported.

7 Claims, 14 Drawing Figures

TRANSPORT ITEM DETECTING ARRANGEMENT

BACKGROUND OF THE INVENTION

The present invention generally relates to a detecting apparatus for detecting presence or absence of an item to be transported, and more particularly, to a detecting arrangement for detecting, for example, a copy paper wound around a photosensitive member in an electrophotographic copying apparatus. The detecting arrangement is adapted to optically effect the detection through employment of a sensor including light emitting and light receiving elements for detecting the item to be transported without contacting said item.

Generally, as a means for detecting presence or absence of items to be transported, there has conventionally been employed for a wide application, an arrangement which utilizes microswitches and the like. In such an arrangement, an actuating arm for controlling on or off of electric contacts in normally disposed on a transport passage of the item to be transported so as to detect the item when the actuating arm is moved based on the movement of said item. If the item to be transported is of a heavy item, the transportation thereof is seldom obstructed by the actuator arm disposed in the transport passage, and thus, an accurate detection may be expected.

However, if the item to be transported is of a very light weight item, for example, a piece of paper in the form of a sheet, there have been cases where the feeding thereof is obstructed by the actuating arm provided on the transport passage, thus resulting in paper jamming or the like. In the case where the paper sheet is rather thin, and is not sufficiently resilient, there is a stronger tendency for the jamming to take place. Accordingly, countermeasures have been taken, for example, by changing the shape of the actuating arm in various ways so as not to obstruct transportation of paper sheets by the actuating arm.

Meanwhile, there has been available a detecting arrangement which detects an item to be transported without any contact therewith. For the detecting arrangement of this type, an optical detecting means has been proposed for actual application, in which a light emitting element and a light receiving element are disposed, for example, with respect to a transport passage as a border line, so that light from the light emitting element is received by the light receiving element. There is also proposed an arrangement in which light emitting and light receiving elements are provided at the same face side for receiving light reflected from the item to be transported. In other words, detection of the item to be transported is effected through utilization of the fact that light is not received by the light receiving element when the light from the light emitting element is intercepted by said item to be transported. By the above arrangement, paper jamming and the like related to the detection may be advantageously prevented without any obstruction by the transportation of the item itself or regardless of the fact that the item to be transported is heavy or light in weight.

In the above case, a circuit arrangement, for example, as shown in FIG. 1 has conventionally been employed in general as a circuit for producing signals especially in the case of detecting presence or absence of paper sheets in a copying apparatus or the like.

In the circuit of FIG. 1, light from a light emitting element LED1 is arranged to be received by a light receiving element PT1 disposed through a transport passage. The light emitting element LED1 has its one end connected to a power source +Vcc through a resistor R1, and the other end thereof connected to a ground. Meanwhile, the light receiving element PT1 has the collector connected to the power source +Vcc, and the emitter to the ground through a resistor R2. While light is received by the light receiving element PT1, said element PT1 is conducted, and a voltage Vo at a point A of the emitter terminal becomes generally close to the power source voltage +Vcc, with the voltage Vo being further supplied to a (−) terminal of a comparator IC1 through a resistor R3. To a (+) terminal of the comparator IC1, there is applied a fixed voltage Vth $$\left( = \frac{Vcc \times R5}{R4 + R5} \right)$$

which serves as a reference voltage at a point B where the power source voltage +Vcc is divided by resistors R4 and R5. Accordingly, in the absence of any paper sheet between the light emitting element LED1 and the light receiving element PT1, the fixed voltage Vth becomes lower than the voltage at the point A, and therefore, the output of the comparator IC1 assumes "Low" state. Thus, when a paper sheet is transported between the light emitting element LED1 and the light receiving element PT1, said element PT1 is turned off, with the voltage Vo at the point A generally reaching the ground potential, and the output of the comparator IC1 is inverted from "Low" state to "High" state. Accordingly, presence or absence of the paper sheet is detected by the state of output of the comparator IC1, and the above signal is, for example, fed to a control section (not shown).

However, in the conventional circuit of FIG. 1 as described so far, when a comparison between the reference voltage Vth and the light detecting signal based on the light receiving element PT1 is to be effected, there have been cases where malfunctions take place due to increase of dark current in the light receiving element PT1 by heat, lowering of light emitting and light receiving amounts by the adhesion of paper scraps, dust and dirt, etc. onto the corresponding elements, and reduction of S/N ratio owing to deterioration with age and the like.

More specifically, for example, of the dark current for the light receiving element PT1 is increased by heat, even when light is intercepted by a paper sheet disposed between the both elements LED1 and PT1, the voltage Vo at the point A is raised by the dark current so as to be higher than the fixed voltage Vth, and the output of the comparator IC1 remains "Low" without being inverted to "High", thus resulting in an erroneous detection. Meanwhile, by the lowering of the light emitting and light receiving amounts due to adhesion of paper scraps, dust and dirt, etc. onto the light emitting element LED1 and light receiving element PT1 or adhesion of a developing material (particularly, toner) onto said elements in the case of an electrophotographic copying apparatus and the like, when the sensor output voltage Vo at the point A is reduced to be lower than the fixed voltage Vth, the output of the comparator IC1 becomes "High" to produce a signal indicating presence of a paper sheet, even if no paper sheet is transported, thus also resulting in an erroneous detection.

Moreover, in the known circuit of FIG. 1, it has been required to effect a fine sensitivity adjustment, since the detection for a presence or absence of the paper sheet is effected by setting the fixed reference voltage Vth. More specifically, owing to the fact that the characteristics of the light emitting element LED1 and the light receiving element PT1 tend to be largely scattered or deviated, variable resistors are employed for the resistors R1 to R5 in FIG. 1 so as to finely adjust the scattering in the characteristics of said light emitting and light receiving elements for effecting a proper detection.

Although the conventional circuit of FIG. 1 has been mainly described with reference to the arrangement in which the light emitting and light receiving elements are separately disposed via the transport passage to effect the detection through the item to be transported, the arrangement is not limited to the above, but the same circuit construction may be applied to the system in which the light emitting and light receiving elements are provided at the same face side for receiving the light reflected from the item to be transported.

The detection of paper sheets, etc. to be transported has been effected in the manner as described so far, but the paper sheet detection is not limited to be effected at the transport passage alone, but may also be effected, for example, with respect to a paper sheet undesirably wound onto a photosensitive member, i.e. a photoreceptor in the form of, for example, a drum or belt, etc. More specifically, in an electrophotographic copying apparatus and the like, a paper sheet is caused to closely adhere onto the photosensitive surface, for example, of a photoreceptor drum for transfer of a toner image formed on said photosensitive surface, onto the paper sheet. Therefore, after completion of the transfer, the paper sheet is separated from the photoreceptor drum so as to be further fed to a fixing section at a subsequent stage, but there are cases where the paper sheet undesirably remains closely adhering to the photosensitive surface of the photoreceptor drum without being separated therefrom, and is thus transported up to the portion of a cleaning device. If the paper sheet should be transported to the cleaning device as described above, the cleaning device itself or the photosensitive surface of the photoreceptor drum may be damaged in some cases, and therefore, it is necessary to detect the paper sheet wound onto the photoreceptor drum particularly before it reaches the cleaning device so as to stop the feeding of the photoreceptor drum. For the detecting means as referred to above, the mechanical switch detecting arrangement by the microswitches and the optical detecting means including the non-contacting light emitting and light receiving elements as described earlier are disposed to confront the photoreceptor drum.

In the mechanical detecting switch arrangement, either the actuating arm of the switch is directly detected by the photoreceptor drum or the paper sheet closely adhering to the photoreceptor drum is separated by a projecting item such as a sharp claw so as to move the actuating arm of the switch by the separated paper sheet. Therefore, if the photoreceptor drum has a soft surface of OPC (Organic Photoconductor) or PET (Polyethylene-terephthalate), there is a great possibility that the surface is undesirably damaged by the actuating arm or projecting item referred to above. Moreover, there has also been such an inconvenience that the copied images are soiled by the developing material particularly toner, etc. adhering to the actuating arm, and further, adhering to the photosensitive surface from the soiled actuating arm.

Concerning the above, when the sensor as described earlier with reference to FIG. 1 is employed, the drawbacks referred to above may be eliminated. However, the sensor arrangement also has the disadvantage that erroneous detection may result due to insufficient light emitting and light receiving amounts, when the light emitting and light receiving elements are soiled by the developing material, etc. Moreover, due to the disposition around the photosensitive member, there is a tendency that the light receiving element PT1 is particularly heated, with a consequent increase of the dark current, thus giving rise to frequent erroneous detections. For the prevention of such an inconvenience, it is necessary to increase S/N ratio of the sensor output for improvement, but there is a limitation to the increase of S/N ratio.

Furthermore, when the photosensitive member is in an endless configuration, the difference in the output signals between the photosensitive member and paper sheet may be detected, but if the photosensitive member has end portions, grippers, etc. provided at the forward end portions of the photosensitive member to hold said member on a drum or the like are output in the form of the same detection signal as for the paper sheet, thereby also giving rise to a faulty detection.

SUMMARY OF THE INVENTION

Accordingly, an essential object of the present invention is to provide an improved detecting arrangement of a type employing a sensor including light emitting and light receiving elements as means for detecting presence or absence of an item to be transported, which is capable of effecting a stable detection at all times without regard to deterioration of the elements, adhesion of dust and dirt thereto, and increase of dark current, etc.

Another important object of the present invention is to provide a detecting arrangement of the above described type which is capable of positively detecting a paper sheet undesirably wound onto a photosensitive member such as a photoreceptor drum in an electrophotographic copying apparatus and the like, without giving any damage to the photosensitive member.

A further object of the present invention is to provide a detecting arrangement of the above described type which is simple in construction and accurate in functioning, and can be readily incorporated into electrophotographic copying apparatuses and the like at low cost.

In accomplishing these and other objects, according to one preferred embodiment of the present invention, there is provided a transport item detecting arrangement which includes a light emitting element and a light receiving element disposed to confront a transport passage as a sensor for detection of an item to be transported, for example, a paper sheet to be fed along said transport passage, and characterized in that there is further provided means for comparing a signal responding to output of the sensor with a signal from a circuit which outputs integrated signal of the output of the sensor, thereby to employ a signal based on result of the comparison as a signal indicative of presence or absence of the item to be transported.

By the arrangement according to the present invention as described above, an improved detecting arrangement has been advantageously presented.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Figure 1:
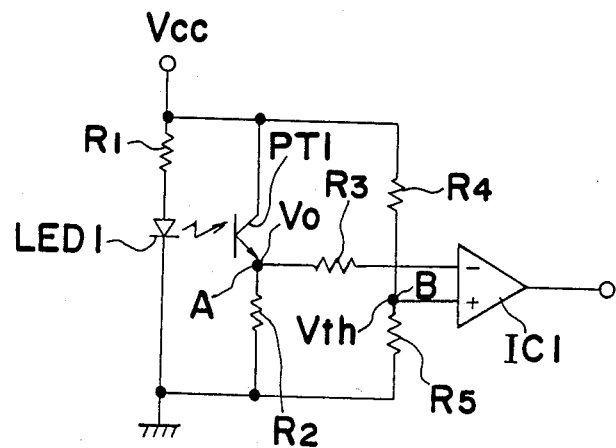
FIG. 1 is an electrical circuit diagram showing a circuit construction of a conventional detecting circuit (already referred to)

Before the description of the present invention proceeds, it is to be noted that like parts are designated by like reference numerals throughout the accompanying drawings.

Figure 2:
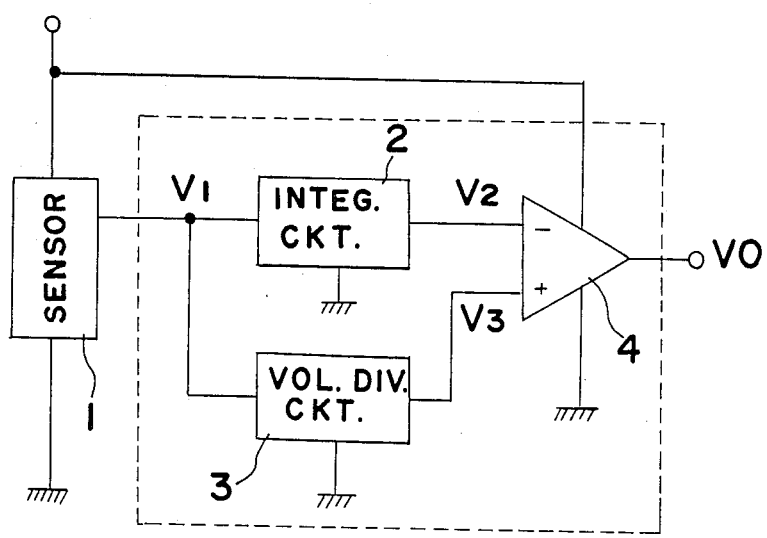
FIG. 2 is an electrical block diagram showing a general circuit construction of a detecting arrangement according to the present invention.

Referring now to the drawings, there is shown in FIG. 2 an electrical block diagram illustrating a general construction of a circuit for detecting presence or absence of an item to be detected according to the present invention.

In the block diagram of FIG. 2, a sensor 1 includes the light emitting and light receiving elements (not shown here) disposed to confront the item to be detected as explained with reference to FIG. 1, and produces the signal V1 based on the light receiving element. This output V1 is an output obtained through amplification of the voltage for the sensor output Vo, and is subsequently applied to an integrating circuit 2 which produces an integration signal V2. The above output V1 is also fed to the voltage dividing circuit 3 so as to be divided into a proper voltage V3. The output V2 from the integrating circuit 2 and the output V3 from the voltage dividing circuit 3 are applied to a comparator 4 for comparison therebetween, and when either of the voltages becomes higher, the output VO of the comparator 4 is inverted. More specifically, on the assumption that the output V2 is applied to a line (−) terminal of the comparator 4, with the output V3 being applied to a (+) terminal thereof, when the item to be detected, e.g., a paper sheet is detected by the sensor 1, the voltage V1 rapidly falls or rises, and accordingly, the voltage V3 is largely varied in the similar manner as in the voltage V1 so as to fall or rise rapidly. Meanwhile, the output V2, which is the integration output signal of the output V1, varies only gradually even upon rapid variation of the output V1, and in this case, if the voltage V1 at the side of the (−) terminal becomes higher than the gradually varying voltage V2, the output VO of the comparator 4 is inverted to "High", while on the contrary, if the voltage V3 at the side of the (+) terminal becomes lower than the voltage V2, the output VO of the comparator 4 is inverted to "Low". In the above case, the relation between the voltages V2 and V3 are such that, for example, in the state where the paper sheet is not detected (i.e., when the voltage V1 is not rapidly varying), the voltage V2 is set to become slightly larger or smaller than the voltage V3, and therefore, the output VO of the comparator 4 is inverted by the inversion of the relation between the voltages V2 and V3 at the rising or falling of the voltage V1 during the detection of the paper sheet.

It should be noted here that one of the features of the present invention resides in that there is provided no fixed reference voltage for comparison with the detection signal V1 as in the conventional arrangements. In other words, based on the fact that the comparison voltage V2 is varying in correspondence to the sensor output V1, although the output V1 is varied (or lowered) through variation of the light emitting and light receiving amounts due to soiling of the elements for the sensor, the voltage V2 for comparison is also varied (or lowered), with the variation of the voltage V3 in the similar manner, and therefore, comparison may be effected for a larger range than in the comparison with respect to the fixed reference voltage, thus making it possible to effect the positive detection of the item to be detected. Thus, although the output V1 of the sensor 1 is largely varied for falling or rising upon detection of the item to be detected by the sensor 1, the signal V2 subjected to the integration only gradually varies following the variation of the output V1, while the voltage V3 immediately varies to correspond to the voltage V1, and the relation between the voltages V3 and V2 is inverted at this time. Accordingly, even when the sensor output V1 is varied by certain influences (e.g., increase of the dark current, lowering of the light emitting and light receiving amounts, etc.), the relation becomes V2>V3 or V3>V2 in the state where the paper sheet is not detected so as to maintain said relation at all times for a more accurate detection.

Figure 3:
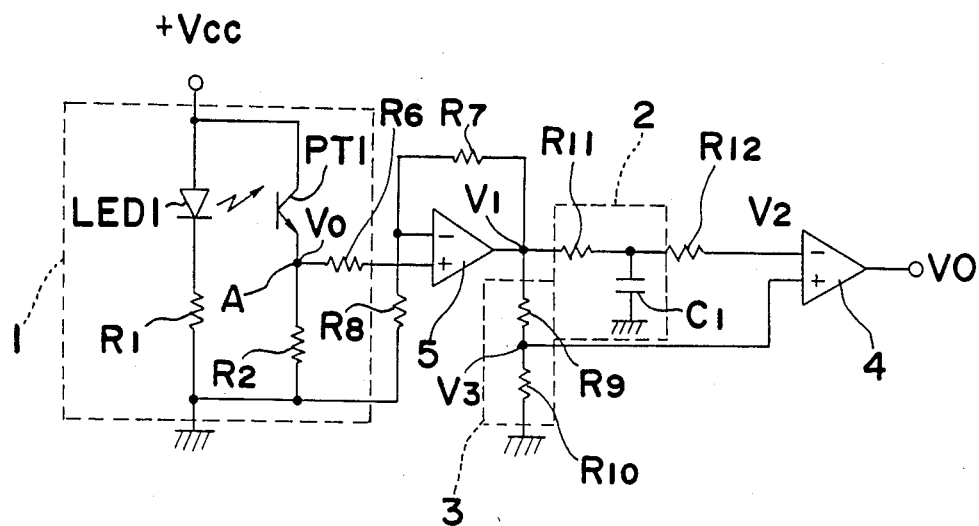
FIG. 3 is an electrical circuit diagram showing an actual circuit construction for the block diagram of FIG. 2 according to one preferred embodiment of the present invention.

Subsequently, with reference to an example of an actual circuit shown in FIG. 3, the detecting circuit according to the present invention will be described in more detail hereinbelow. It is to be noted that the circuit in FIG. 3 represents only one example of the present invention, and that the present invention is not limited thereby. It is also to be noted that, in FIG. 3, since the circuit arrangement for the sensor output Vo at the portion of the sensor 1 surrounded by dotted lines is generally the same as that in the conventional circuit of FIG. 1, detailed description thereof is abbreviated for brevity. It should be further noted here that, by way of example, description will be made on the assumption that the light receiving element PT1 and light emitting element LED1 are provided on the same face side at part of the transport passage for the paper sheet so that the light receiving element PT1 receives the reflection light (especially scattering light) from the paper sheet.

In FIG. 3, the sensor output Vo by the light receiving element PT1 is applied to one input terminal (i.e., (+) terminal) of an operational amplifier 5 through a resistor R6. The output of the operational amplifier 5 is subjected to voltage division by resistors R7 and R8 so as to be negatively fed back to the other (−) terminal of said amplifier 5. Accordingly, the operational amplifier 5 has its output voltage represented by $$V1 = V0 \cdot \left(1 + \frac{R7}{R8}\right)$$

with respect to the input Vo, thus amplifying the sensor output Vo by $$\left(1 + \frac{R7}{R8}\right)$$

times. The amplified output V1 is divided into proper voltages by resistors R9 and R10 which constitute the voltage dividing circuit 3, the output V3 of which is applied to the (+) terminal of the comparator 4. Here, the output V3 is the signal corresponding to the sensor output Vo, and varying in immediate response to the variation of the sensor output V0.

On the other hand, the output V1 from the amplifier 5 is applied to the (−) terminal of the comparator 4 through resistors R11 and R12. Since a capacitor C1 is connected between a junction of the resistors R11 and R12 and the ground, the integrating circuit 2 is constituted by the resistor R11 and the capacitor C1. Therefore, the voltage V2 obtained by integrating the output V1, is determined by the time constant t of the resistor R11 and the capacitor C11 (t=R11·C1), and is to be gradually varied without immediately responding to the variation of the sensor output V1.

Figure 4:
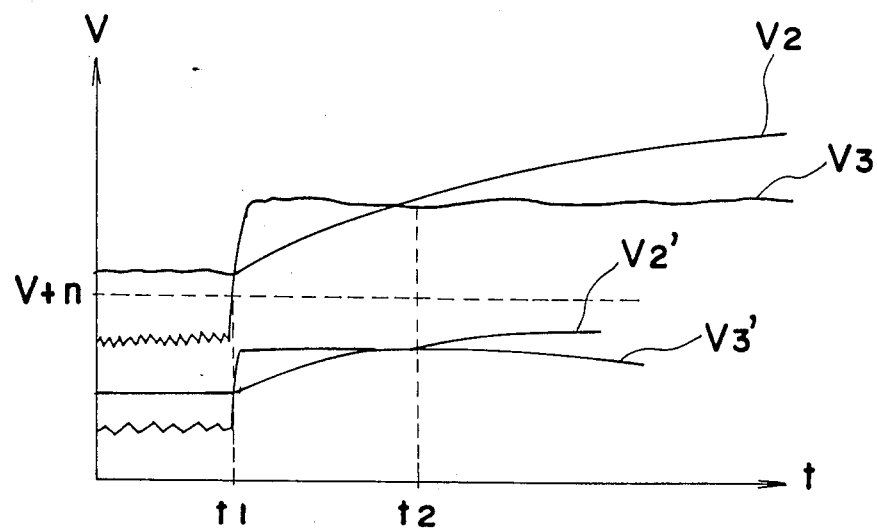
FIG. 4 is a time-chart showing output waveforms in the detecting arrangement of FIG. 3.
Figure 5:
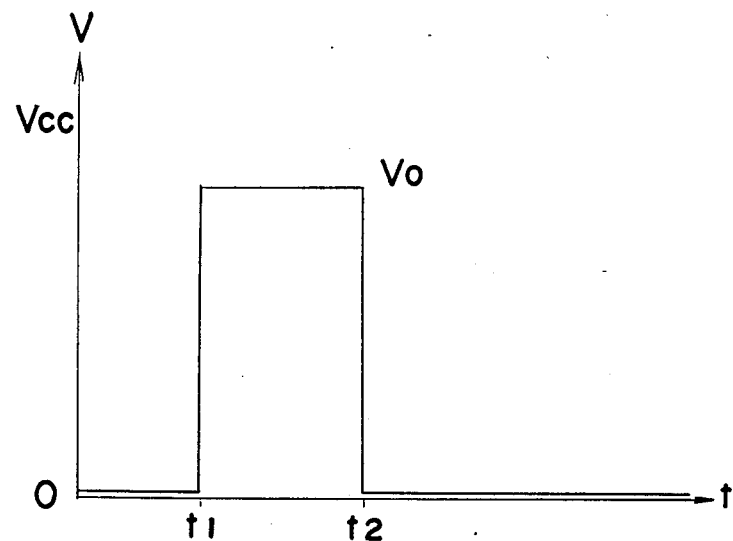
FIG. 5 is also a time-chart showing an output waveform of a detecting signal in FIG. 4.

Now, on the assumption that the light emitting element LED1 and the light receiving element PT1 are disposed, for example, on the same face so that irregular reflection light from a paper sheet which is the item to be detected is received by the light receiving element PT1, waveforms when the values for the resistors R9, R10, R11 and R12 and the capacitor C1 are properly determined, are shown in FIG. 4, in which it is indicated that the paper sheet reaches the region to be detected when the relation is t=t1, with the leading edge appearing on the light receiving element PT1. In the output variation, the output V3 immediately rises in the similar manner as in the sensor output Vo, while the output V2 gradually rises as shown in FIG. 4. Accordingly, the resistors R9 and R10 are so set that, in the stable state of the sensor 1, i.e., in the state where no paper sheet is present, the outputs V2 and V3 of the respective circuits based on the sensor output Vo are in the relation V2>V3. Therefore, the light reflected from the paper sheet is received by the light receiving element PT1 at the relation t=t1, and the output V3 varies immediately, while the output V2 gradually varies according to the time constant t, and the relation between the outputs V2 and V3 is inverted when the relation is T1≦t≦t2. thus, the output of the comparator 4 which was "Low" up to that time due to the relation V2>V3 is inverted to "High", since the relation becomes V2<V3. The state of outputs at the above time is shown in FIG. 5.

Here, if the light emitting amount and light receiving amount of the light emitting element LED1 and light receiving element PT1 are reduced by some causes, the respective signals V2 and V3 based on the sensor output Vo similarly vary as in curves V2' and V3' shown in FIG. 4. However, in the stable state, the relation between the signals V2 and V3 remains to be at V2'>V3' at all times. Thus, when the leading edge of the paper sheet reaches the sensor portion, the signal V3 is instantaneously varied as in V3', while the signal V2 is gradually varied as in V2', and therefore, the relation becomes V3'>V2' for effecting the paper sheet detection.

Meanwhile, although the voltage at the point A, i.e., the sensor output Vo, rises due to increase of the dark current by heat, etc., the outputs V2 and V3 are also increased following the rising of the output Vo., and thus, the relation V2>V3 is not varied at all in the non-detecting state so as to become V2<V3 only during the detecting period for the positive detection of the paper sheet.

On the contrary, in the case where the comparison is effected by the comparator 4 through employment of the fixed reference voltage Vth as in the conventional arrangements, even when the voltage V3' rises, this voltage V3' does not exceed the reference voltage Vth, thus making it impossible to effect the paper sheet detection. In other words, it becomes impossible to detect the paper sheet passing through the sensor portion.

In the arrangement in which the sensor 1 is provided in the transport passage for the paper sheet as in the electrophotography and the like, there is no possibility that rapid variations (noises) are produced in the sensor output Vo unless external light is incident thereupon. However, if noises should be produced by some causes, then the output VO of the comparator 4 varies from "Low" to "High" for effecting the paper sheet detection.

Figure 6:
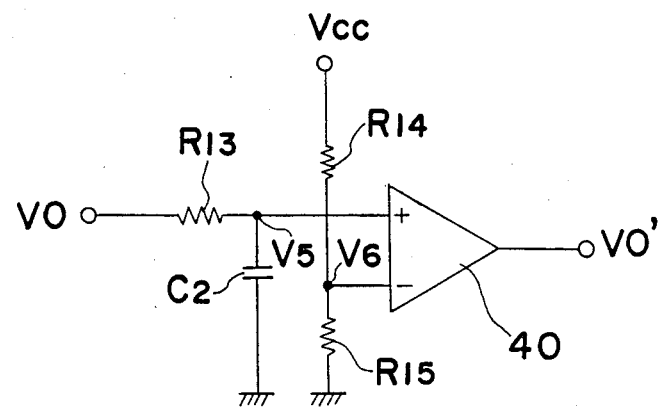
FIG. 6 is an electrical circuit diagram showing one example of an output circuit subsequent to the detecting circuit of FIG. 3.

From the viewpoint of preventing the inconvenience as described above also, it is effective to add the circuit as shown in FIG. 6.

More specifically, in FIG. 6, the output VO of the comparator 4 as in FIG. 3 is further subjected to the integration by an integrating circuit including a resistor R13 and a capacitor C2 to produce an output V5 which is applied to one comparison input terminal (i.e., the (+) terminal) of a comparator 40, while a fixed reference voltage V6 is fed to the other (−) terminal of the comparator 40. The reference voltage V6 is the voltage obtained by dividing the power source voltage +Vcc by resistors R14 and R15, and is normally set in the relation as V6>V5. Accordingly, the output of the comparator 4 remains to be "Low" when the paper sheet detection is not effected. In the above state, even when the output VO of the comparator 4 instantaneously becomes "High" by the noise signal, since the output is subjected to the integration, the output VO becomes "Low" before the output V5 becomes higher than V6, whereby the erroneous detection by noises may be prevented for making it possible to effect the paper sheet detection at a higher accuracy.

Figure 13:
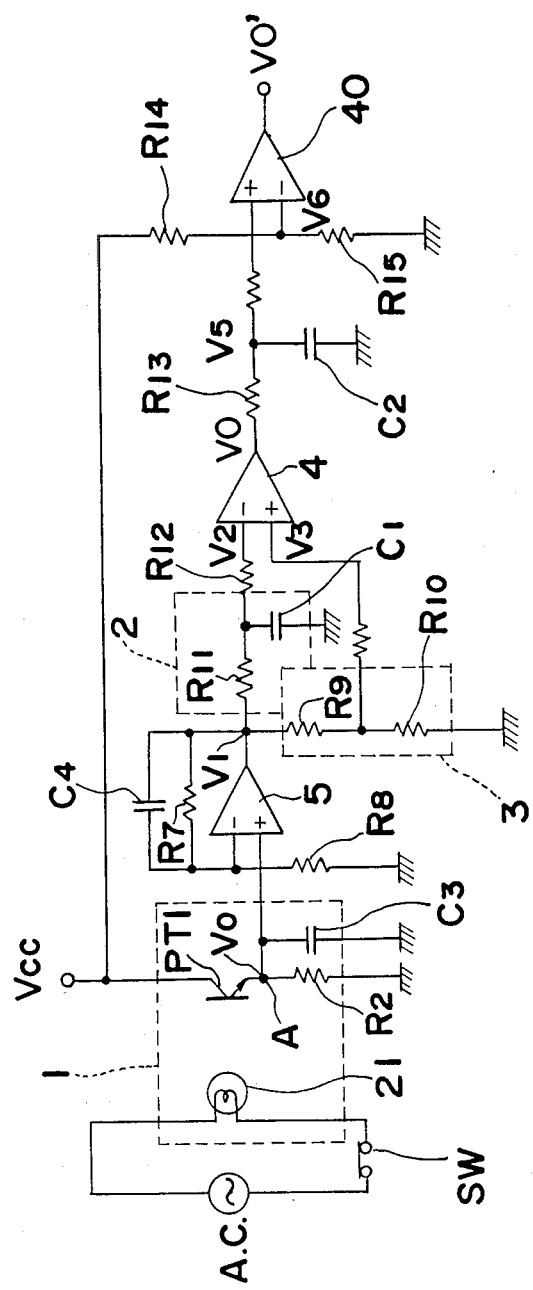
FIG. 13 is an electrical circuit diagram of a paper sheet detecting arrangement according to another embodiment of the present invention, in which the additional circuit of FIG. 6 is combined with the fundamental circuit of FIG. 3.

Referring to FIG. 13, there is shown a circuit arrangement in which the additional circuit of FIG. 6 is combined with the fundamental circuit of FIG. 3. In FIG. 13, a charge erasing lamp 21 is connected to an AC power source through a switch SW. More specifically, the switch SW is adapted to be turned on based on a control signal fed from a control circuit (not shown), for example, of a copying process, so as to drive the charge erasing lamp 21, and is arranged to energize the charge erasing lamp 21 before a leading edge of the image formed on the photosensitive member (not shown here) reaches a position where it confronts said lamp 21. For the charge erasing lamp 21, there is selected such a lamp as is capable of emitting light having a frequency not damaging the photosensitive member during erasing of charge therefrom. In other words, the charge erasing lamp 21 has been conventionally employed as part of the process for erasing charge of the photosensitive member, and according to the present invention, the lamp 21 is commonly used as a sensor to prevent any damage to the photosensitive member. The light receiving element PT1 corresponding to the lamp 21 for receiving light reflected from the photosensitive member has its collector connected to the power source voltage +Vcc, and the emitter thereof to the ground through a parallel connection of the resistor R2 and a capacitor C3 (with the resistor R6 in FIG. 3 being omitted here). The sensor output Vo at the point A by the light receiving element PT1 is applied to the (+) terminal of the operational amplifier 5. This operational amplifier 5 has its output V1 fed back to the (−) terminal thereof through a parallel connection of the resistor R7 and a capacitor C4, and the amplification constant thereof is determined based on the relation with respect to the resistor R8. In other words, the output V1 of the amplifier 5 is in the relation $$V1 = V0\left(1 + \frac{R7}{R8}\right)$$

with respect to the input Vo thereof as described earlier.

The above features according to the present invention will be described in more detail with respect to detection of a paper sheet wound onto a photosensitive member, e.g., photoreceptor drum in an electrophotographic copying apparatus shown, by way of example, in FIG. 7.

Figure 7:
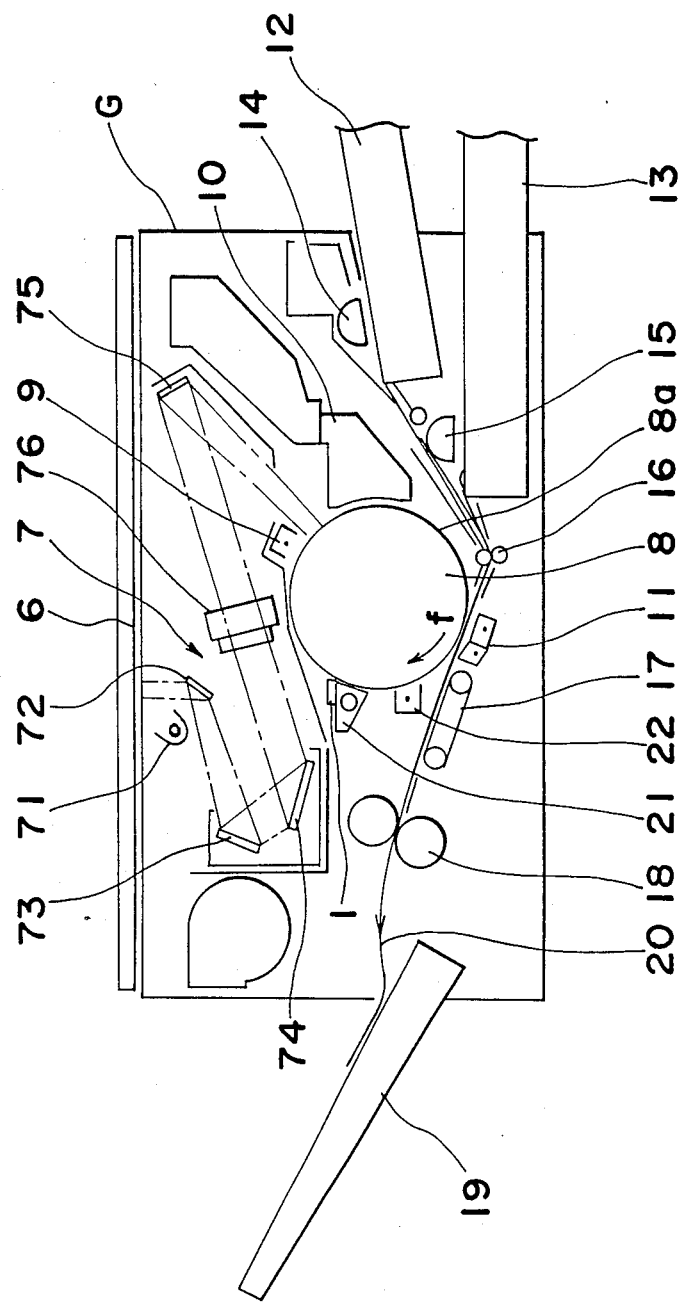
FIG. 7 is a schematic side sectional view of an electrophotographic copying apparatus to which the present invention is applied for detection of a paper sheet wound onto a photosensitive member thereof.

The electrophotographic copying apparatus of FIG. 7 generally includes a photosensitive member or photoreceptor 8 in a configuration of a drum having a photosensitive surface 8a formed on the other peripheral surface thereof, and rotatably provided generally at a central portion of an apparatus housing G for rotation in a direction indicated by an arrow f, and various processing devices such as a corona charger 9 for preliminarily charging the photosensitive surface 8a of the photoreceptor drum 8 before exposure, a developing and cleaning device 10 for visualizing an electrostatic latent image formed on the photosensitive surface 8a after the exposure, into a visible toner image, and a transfer device 11 for transferring the toner image onto copy paper sheets, etc., all of which are sequentially provided around the photoreceptor drum 8. On the upper portion of the apparatus housing G, an original document placing platform 6 of a transparent light transmitting material is provided, while in position below the platform 6, there is provided an optical system 7 including a light source 71 for illuminating an original document (not particularly shown) placed on the platform 6, mirrors 72, 73, 74 and 75 for reflecting light image from the original document and a lens assembly 76 for forming the image of the original document onto the photosensitive surface 8a.

The copy paper sheets are accommodated in a cassette 12 or 13 provided in upper and lower stages at the right side in FIG. 7, and are fed, one sheet by one sheet, based on the selective driving of a corresponding paper feeding roller 14 or 15. The copy paper sheet thus fed is once stopped at register rollers 16 so as to be controlled thereby so that a leading edge of the toner image formed on the photosensitive surface 8a of the photoreceptor drum 8 may be aligned with the leading edge of the paper sheet of the transfer device 11. After transfer of the toner image at the transfer section, the copy paper sheet is separated from the photosensitive surface 8a so as to be fed to fixing rollers 18 through a transport belt 17, and then, onto a paper discharge tray 19 along a transport passage generally indicated by an arrow 20 in FIG. 7. In the above transport passage 20, the sensor 1 described earlier is provided on the upper portion of the charge erasing lamp 21 referred to earlier for detection of the paper sheets, and also, of a paper sheet undesirably wound onto the surface 8a of the photoreceptor drum 8 after completion of the transfer.

Meanwhile, part of the toner not subjected to the transfer still adheres to the photosensitive surface 8a after the transfer. In order to remove such remaining toner and also, to make the potential on the photosensitive surface 8a uniform, a charge eraser 22 and the charge erasing lamp 21 are disposed around the photoreceptor drum 8 in positions subsequent to the transfer device 11 and prior to the corona charger 9 with respect to the rotating direction of the photoreceptor drum 8. By passing through these charge erasing means, the toner remaining on the photosensitive surface 8a is cleaned when the surface 8a confronts the developing and cleaning device 10 in preparation for the subsequent image formation.

Figure 8:
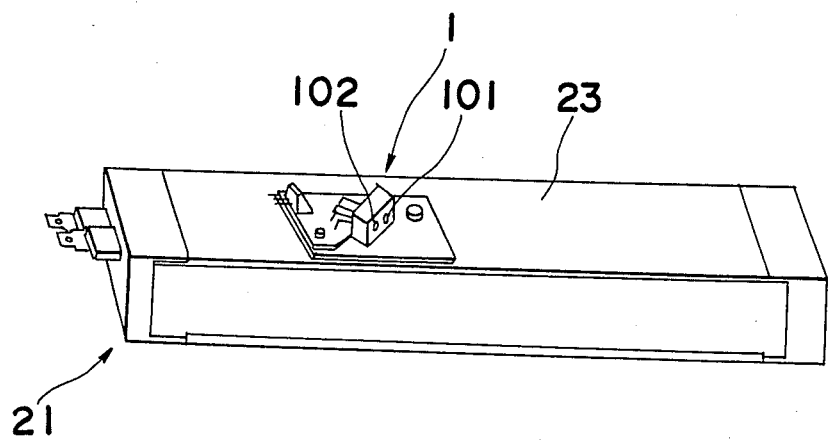
FIG. 8 is a perspective view of a casing for a charge erasing lamp which is employed in the copying apparatus of FIG. 7, and on which a sensor is disposed.

In the copying apparatus having the construction as described so far, for the necessity of detecting the paper sheet undesirably wound onto the photoreceptor drum 8 before the paper sheet reaches the developing and cleaning device 10, the sensor 1 is provided, for example, at the position of the charge erasing lamp 21. In FIG. 8, this sensor 1 is provided on a casing 23 of the charge erasing lamp 21. More specifically, in this sensor 1, the light emitting element 101 (LED1) and the light receiving element 102 (PT1) provided side by side are disposed at an inclination of about 45° with respect to the direction of a rotational axis of the photoreceptor drum 8, whereby light is projected from the light emitting element 101 onto the photosensitive surface 8a of the photoreceptor drum 8, and irregular reflected light therefrom is received by the light receiving element 102. In the above case, if the photosensitive surface 8a has a face in a state of a mirror face (e.g., OPC (Organic Photoconductor) photosensitive member, etc.), most of the light is subjected to a regular reflection without being received by the light receiving element 102, with the irregular reflected light from the paper sheet being mostly received thereby. Therefore, the outputs V2 and V3 of the respective circuits 2 and 3 assume the state as shown in FIG. 4, thus making it possible to detect the paper sheet wound onto the photoreceptor drum 8.

It should be noted here that, if the photosensitive surface 8a is formed into an endless configuration, it becomes possible to clarify a border between the leading edge of the paper sheet and the photosensitive surface 8a as shown in FIG. 4, without any tendency toward erroneous detection. However, photosensitive members are not endless at all times, but there are some photosensitive members having end portions. For example, in an arrangement in which a photosensitive sheet member (master sheet) is supported on an aluminum drum, the leading and trailing edges of the photosensitive sheet member are held on the aluminum drum, with the photosensitive sheet member being held in close contact with the drum surface. Therefore, grips or the like for holding the photosensitive sheet member on the drum are exposed on the surface of the drum so as to be undesirably detected by the sensor 1, the state of which is shown in FIG. 9.

Figure 9:
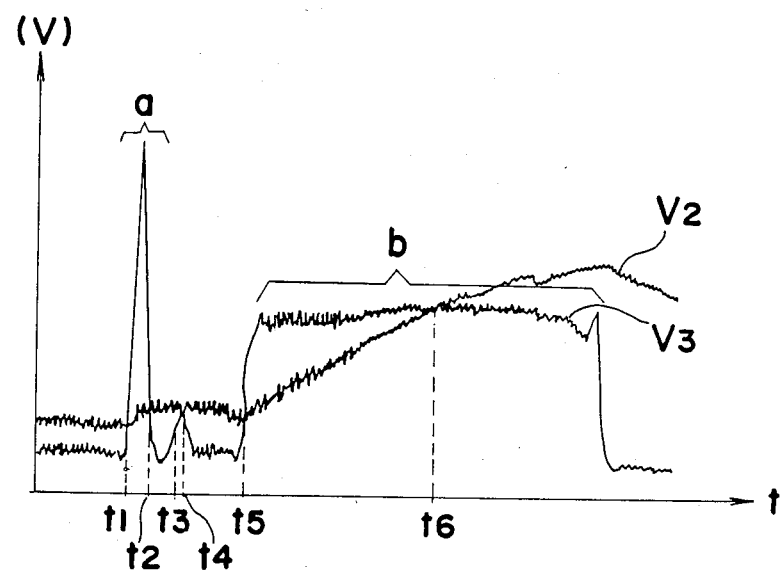
FIGS. 9 through 12 are time-charts explanatory of functions of the detecting arrangement of the present invention.
Figure 10:
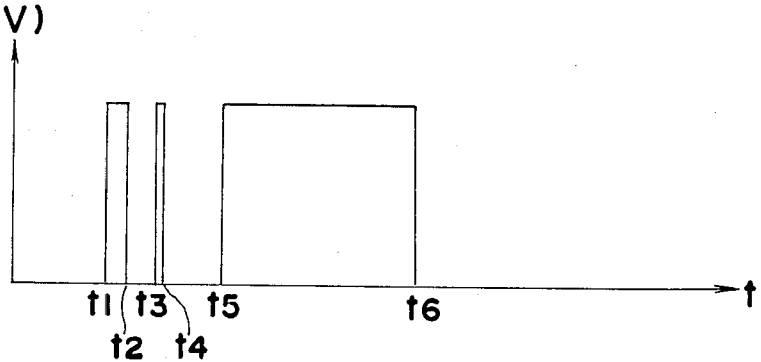

In FIG. 9, V3 represents the output based on the sensor 1, and a portion "a" of V3 relates to a signal based on the grips for holding the photosensitive sheet member, and a portion "b" thereof indicates a signal based on the paper sheet detection. As shown in FIG. 9, when a paper sheet wound onto the photosensitive sheet member in the drum shape having the grips is to be detected, the output VO of the comparator 4 in FIG. 3 assumes the state as shown in FIG. 10 by the detection signal for the grips. In other words, the grip portions of the photosensitive sheet member 8a are undesirably detected as the paper sheet.

Figure 11:
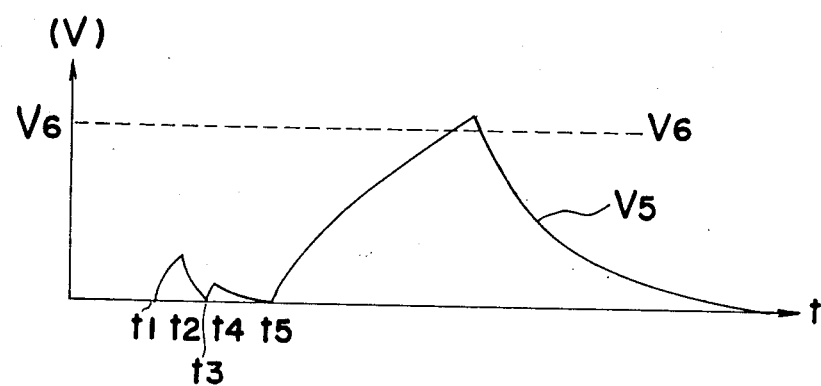
Figure 12:
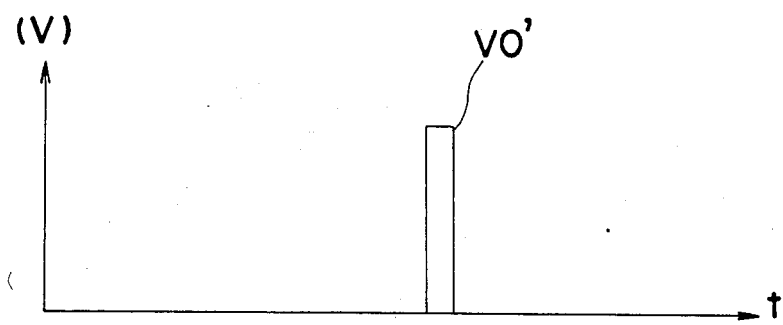

However, by applying the output VO of the comparator 4 shown in FIG. 3 further to the circuit given in FIG. 6, there is no possibility that the grip portions are erroneously detected as a paper sheet. More specifically, the integrated output V5 assumes a state as illustrated in FIG. 11, with the signal of the sharp variation at the grip portions being removed by the integrating circuit, and the output V0 of the comparator 40 is inverted to "High" only when the output V5 exceeds the reference voltage V6 for the comparison, thus making it possible to accurately detect only the wound paper sheet. The above state of detection is shown in FIG. 12. Upon feeding of the output signal of this comparator 40 to the control section for effecting the process control of the copying apparatus, the control section stops the copying process control, thus causing the photosensitive member to stop for shutting down the copying operation.

Figure 14:
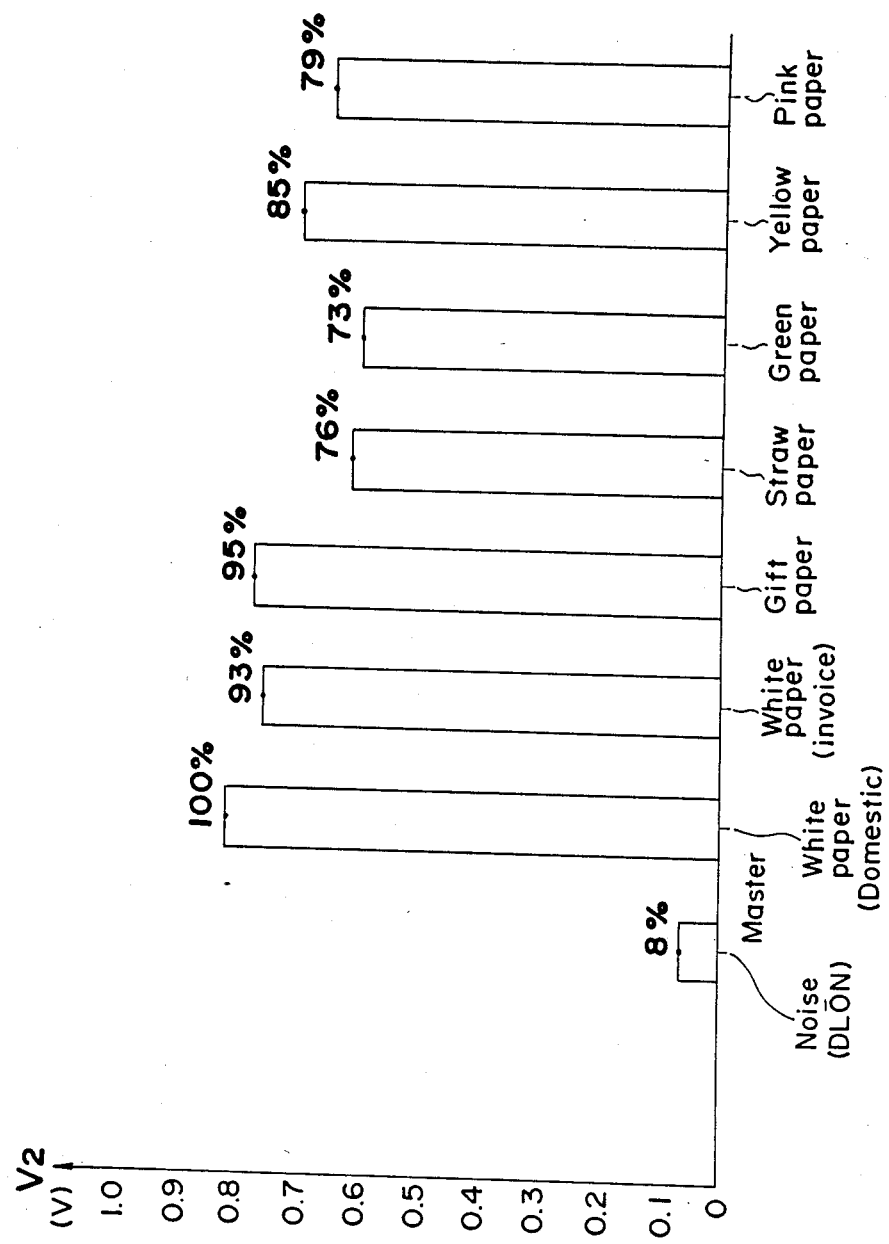
FIG. 14 is a characteristic diagram showing the state of detection (S/N ratio) according to the classifications of paper sheets in the present invention.

FIG. 14 is a characteristic diagram showing voltage ratios when various paper sheets are detected by the sensor 1 according to the present invention in which the light receiving element is inclined. In FIG. 14, it is shown that, by disposing the light receiving element PT1 of the sensor 1 in the inclined state, S/N ratios based on the signals from the respective paper sheets may be increased as compared with the signals (noises) based on the reflected light from the photosensitive member 8.

As is clear from the foregoing description, according to the present invention, in the paper sheet detecting arrangement in which the sensor, including the light emitting and light receiving elements, is disposed on the transport passage for detecting the paper sheet fed through the passage based on the reflected light from the paper sheet or through interception of light by the paper sheet, there is provided the means for comparing the signal obtained by integrating the sensor output with the signal corresponding to the sensor output signal so as to detect the presence or absence of the paper sheet, and therefore, even when the sensor output fluctuates, the signal for comparison is varied in response thereto, thus making it possible to effect a positive detection, with any erroneous detection being prevented. Moreover, by further integrating the output of the above comparing means so as to compare this signal with the reference signal for effecting the paper sheet detection, a still more accurate detection may be expected. Particularly, there is no possibility that any erroneous detection may result from noises momentarily taking place. Furthermore, owing to the employment of the charge erasing lamp, it becomes possible to effect a positive paper sheet detection without any damage to the photosensitive member.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A transport item detecting arrangement which comprises a light emitting means and a light receiving means disposed to confront a transport passage as a sensor means for detection of an item to be transported along said transport passage, the improvement comprising means for comparing a signal responding to an output of said sensor means with an integrated signal from a circuit which outputs an integrated signal of said sensor means output, thereby to employ a signal based on result of said comparison as a signal indicative of presence or absence of the item to be transported.

2. A transport item detecting arrangement as claimed in claim 1, wherein said signal responding to the output of said sensor means is set to be slightly larger or smaller than the integrated signal.

3. A transport item detecting arrangement as claimed in claim 1, wherein said item to be transported is a paper sheet.

4. A transport item detecting arrangement which comprises a light emitting means and a light receiving means disposed to confront a transport passage as a sensor means for detection of an item to be transported along said transport passage, the improvement comprising a first means for comparing a signal responding to an output of said sensor means with an integrated signal from a circuit which outputs an integrated signal of said sensor means output, and a second means for comparing an integrated signal obtained by passing said output signal based on the comparison by said first comparing means through another integrating circuit, with a reference signal, thereby to employ an output signal from said second comparing means as a signal indicative of presence or absence of the item to be transported.

5. A transport item detecting arrangement as claimed in claim 4, wherein said item to be transported is a paper sheet.

6. In an electrophotographic copying apparatus comprising a photosensitive member for forming an image of an original document thereon and a charge erasing lamp provided to erase an electrical charge from said photosensitive member, a paper sheet detecting arrangement which comprises a sensor having a light receiving element which receives light irradiated by said charge erasing lamp as a reflected light from said photosensitive member, an integrating circuit for integrating an output of said sensor, and a comparing means for comparing an integrated signal from said integrating circuit with a signal responding to said sensor output signal, thereby to detect presence or absence of a paper sheet wound onto said photosensitive member based on a comparison output from said comparing means.

7. In an optical system including a light source and a photoelectric device for detecting a wound paper sheet, a paper sheet detecting arrangement which comprises a charge erasing lamp employed as said light source, a photoelectric element for the photoelectric device adapted to receive light irradiated from the light source as a reflected light from a photosensitive member irrespective of kinds of the light source, a first means for comparing a signal responding to an output of said photoelectric element with a signal from a circuit for producing an integrated signal of the output of said photoelectric element, and a second means for comparing an integrated signal obtained by passing said output signal based on the comparison by said first comparing means through another integrating circuit, with a reference signal, thereby to employ an output signal from said second comparing means as a signal indicative of presence or absence of the item to be transported.

* * * * *